Jan. 15, 1957  J. N. NIERATKO  2,777,729
AUTOMOBILE HAND REST
Filed July 1, 1952  2 Sheets-Sheet 1
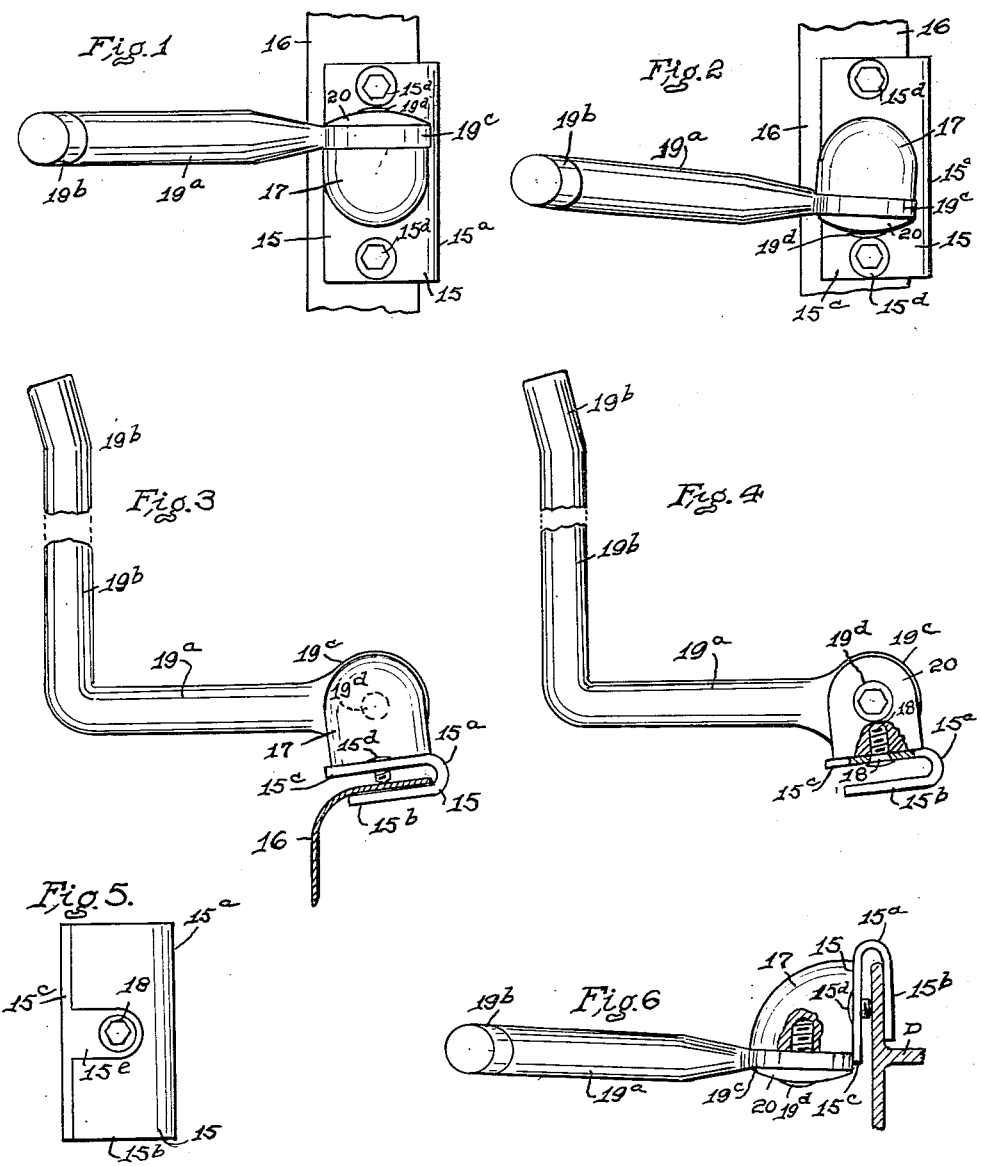
INVENTOR.
Jacob N. Nieratko
BY Walter W. Burns
Attorney

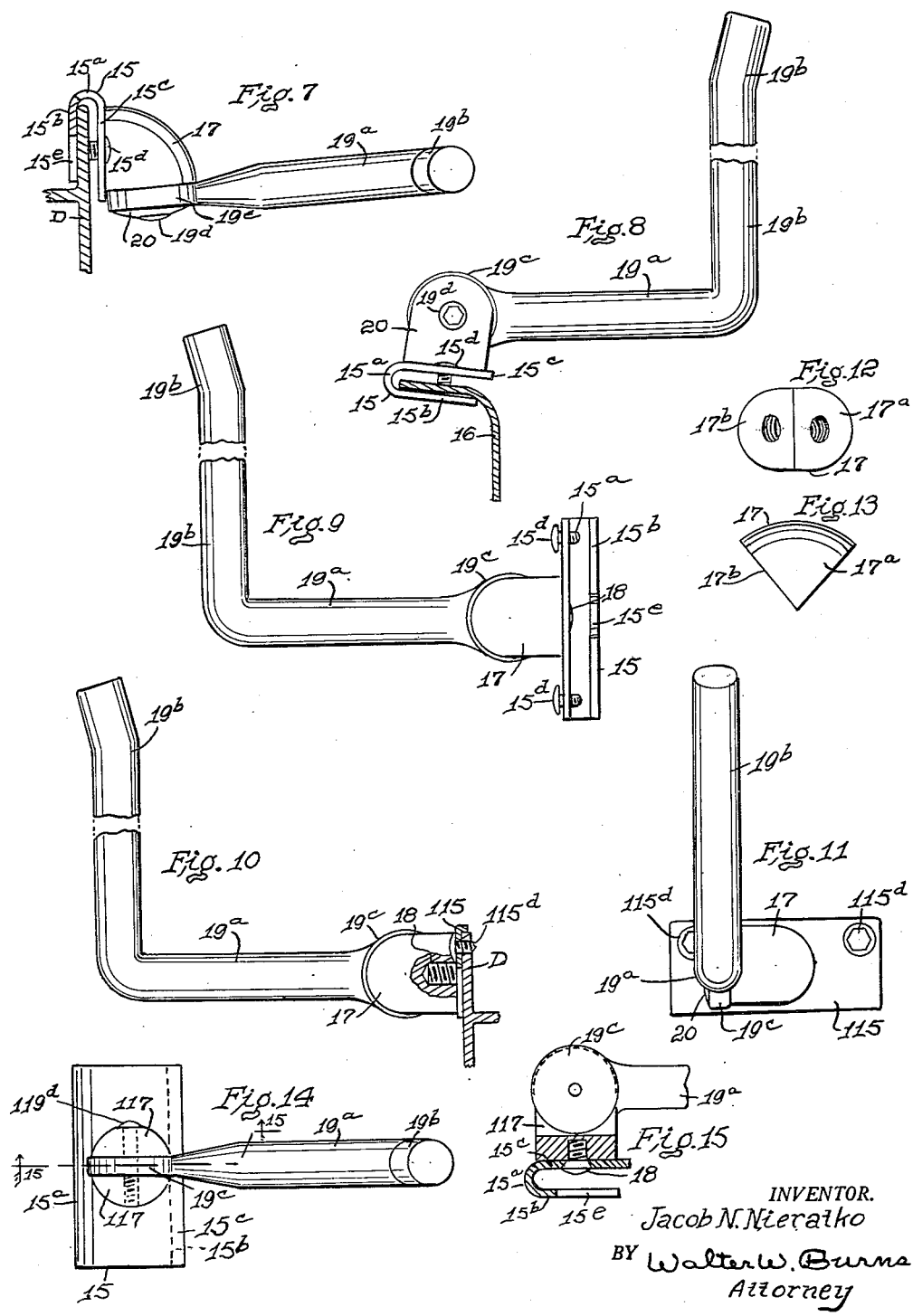

United States Patent Office 2,777,729
Patented Jan. 15, 1957

2,777,729

AUTOMOBILE HAND REST

Jacob N. Nieratko, Englewood, N. J.

Application July 1, 1952, Serial No. 296,587

2 Claims. (Cl. 296—49.2)

The invention relates to an attachment for automobiles and has particular relation to an attachment for the outside of an automobile for the support of the hand, wrist or arm of an operator or passenger.

The primary object of this invention is the provision of an improved rest for the outside of an automobile for the support of the hand, wrist or arm of a person riding in the automobile.

Another object of the invention is the provision of such a hand rest for automobile riders which will hold the weight of the hand and arm but will not confine the same against easy removal.

A further object of the invention is the provision of a hand rest for automobile riders which will be adapted for use on either side of the automobile.

A still further object of the invention is the provision of a hand rest for automobile riders which will have a more or less universal adjustment in that it may be attached to the rim of a door or window and may be set at various angles to suit the needs or desires of the user.

Another and further object of the invention is the provision of a hand rest for the outside of an automobile which has a clamp for securing the rest to a door or window edge, a supporting means for resting the hand or arm and a connection member which will give practically an universal connection between the clamp member and the hand carrying means which will enable the device to be attached to the door or window edge, regardless of its angle to the horizontal.

Other and further objects of the invention will be apparent to those skilled in the art from a reading of the complete specification.

Referring to the drawing wherein is illustrated a preferred form of the invention, Fig. 1 is a top plan view of the invention attached to the left door window of an automobile.

Fig. 2 is similar to Fig. 1 but with the connection member 17 in reversed position.

Fig. 3 is an elevational view of Fig. 1.

Fig. 4 is an elevational view of Fig. 2.

Fig. 5 is a bottom view of the clamping member 15.

Fig. 6 is a plan view of the invention as attached to the forward edge of a left side door of an automobile.

Fig. 7 is a plan view of my invention attached to the forward edge of a right side door of an automobile.

Fig. 8 is an elevational view of the invention attached to the edge of a right side door of an automobile.

Fig. 9 is a rear elevational view of the invention assembled for attachment to the forward edge of a left door.

Fig. 10 is a partly-sectional elevational view of the invention, illustrating an alternative form of securing member.

Fig. 11 is a side view of Fig. 10 from the left.

Figs. 12 and 13 are detail views of the connection member at 90° from each other.

Fig. 14 is a top plan view showing an alternative form of the connection member.

Fig. 15 is a view of Fig. 14 from the bottom of the figure.

Throughout the specification and drawing similar reference characters refer to the same or similar parts.

The invention comprises, essentially, a hand supporting means which has an outwardly projecting portion and an upwardly extending portion, a clamp or other securing means for attachment to the door or other part of an automobile, and a connection between the clamping or securing means and the hand supporting means, the connection having adjustments for adjusting the position of the hand supporting means on the clamping or other securing means to suit the conditions of the point of attachment on the automobile and the length of the arm of the user.

Referring particularly to Figs. 1 and 2, wherein I have illustrated a plan view of my invention, as attached to the window of the left hand door of an automobile, 15 designates the clamp or securing means by which the invention is held in place. The clamping member 15 is provided with a loop portion 15$^a$ within which the edge 16 of the automobile window is received between the relatively flat portions 15$^b$ and 15$^c$.

In order to hold the clamping member 15 in place, the screws 15$^d$ are provided. These screws 15$^d$ are so placed that when tightened, they will engage the flange or edge 16 of the window to hold the clamping member in place. In order to minimize the opportunity for unauthorized removal of the clamping member, the screws 15$^d$ are provided with hexagonal holes for use with a wrench of similar shape, as is well known in the art.

On the outer side of the flat portion 15$^c$ of the clamping member 15, I provide the connection 17. This connection 17 is provided with two non-parallel surfaces 17$^a$ and 17$^b$. The surface 17$^a$ contacts the outer flat surface of the flat portion 15$^c$ of the clamping member 15. To hold the connection 17 on the clamping member 15, there is a screw 18. This screw 18 is preferably operated from the inside of the clamping member 15. To permit the installer to reach the screw-head of the screw 18, I cut away a small portion of the flat portion 15$^b$ of the clamping member 15 as at 15$^e$ in Fig. 5, this Fig. 5 illustrating the underside of the clamping member 15. The other plane surface 17$^b$ of the connection member 17 is for attachment to the hand supporting portion of the invention which will now be described.

To support the hand, wrist or arm, there is an outwardly extending portion 19$^a$ which is sufficiently long to receive the hand, wrist or arm of the user. This outwardly projecting portion has at its outer end, an upwardly extending portion 19$^b$, which is shown in the illustrated embodiment, though not necessarily so, as being integral with the outwardly projecting portion 19$^a$. The upper end of the upwardly extending portion 19$^b$ is shown as being bent outwardly to a slight degree, though this is not necessary.

At the inner end of the outwardly projecting portion 19$^a$ is attached a disk-shaped portion 19$^c$ which is so shaped as to fit the plane surface 17$^b$ of the connection member 17. This disk-shaped portion 19$^c$ has a screw opening at its center to receive the screw 19$^d$. Between the screw head of the screw 19$^d$ and the face 17$^b$, there is provided a washer member 20 which has one straight edge to engage the upper surface of the portion 15$^c$ of the clamping member 15. This prevents turning of the washer 20 during the tightening operation of the screw 19$^d$ and assists in retaining the parts in adjusted position after the screw 19$^d$ has been tightened. Like the other screws already described, the screw 19$^d$ is provided with a hexagonal opening for reception of a tool of similar shape to deter unauthorized removal of the invention from an automobile after installation.

The faces 17a and 17b while made so that they are in planes which make substantially 90° to each other, it may be found that in some instances, it is advantageous to form the surfaces so that they will make an angle to each other which will be slightly greater or slightly less than 90°. If so made, slightly more or less than 90°, the position of the connection member 17 may be reversed as shown in Figs. 1 and 2, thus varying the tilt of the upwardly extending portion 19b.

In Fig. 6 where the attachment of the clamping member 15 is made to the edge of the left door, or in Fig. 7 where the attachment is made to the right door edge, the connection member 17 is so adjusted, by the screw 18, that the outwardly projecting portion 19a extends substantially normal to the outer face of the portion 15c of the clamping member 15. With the connection member 17 in the adjusted position as shown in Figs. 5 and 7, the outwardly projecting portion 19a has a forward lead while if the position of the connection 17 is reversed, the position of the outwardly projecting member 19a would be changed. In addition, if the portions 19a, 19b are made of aluminum or magnesium or any of their alloys, they will be easily bent to assume the exact position desired. While the cross section of the portions 19a and 19b are shown as circular, they may be made in any one of many shapes to fit the hand or wrist to promote the comfort of the user.

Particular attention is invited to the fact that the supporting means 19a, 19b, 19c, the clamping member 15 and the connection 17 are all reversible. By this construction, my invention becomes completely reversible and thus may be used on either side of an automobile. The reversibility of the connection member 17 and the positioning of the disk-shaped portion 19c in a vertical plane, makes it possible to use my invention either on the edge of a curved window or on the edge of a door as illustrated in Figs. 3 and 6, for examples. And by having the disk-shaped member 19c in a vertical plane, it is possible to regulate the angle of the upwardly extending portion 19b and adjust it by the screw 19d at the desired angle for the comfortable support of the hand, wrist or arm of the user, as desired.

By the proper adjustment of the connection member 17 by the screw 18 and the adjustment of the outwardly projecting portion 19a, it is possible to use my invention on the forward sloping edges of automobile doors.

By these constructions of the various parts, the use of my invention, from a practical standpoint, is practically universal as to the parts of an automobile where such a hand or wrist rest might be desired.

In Fig. 10, I have illustrated another form of the securing means than the clamping member 15. In this form, the securing member 115 has a pair of screws 115d which are threaded in holes in the door D to hold my invention in place. The connection member 17 is similar to the part so designated in previously described structures. In assembling the parts, the screw 18 passes through the securing member 115 to hold the connection member 17 in proper relation.

In the installation of my invention on an automobile, it is first decided where the invention is to be placed. The securing member, as the clamping member 15, is held at the proper place where it is believed it will be installed to properly support the hand, wrist or arm. With the other parts tentatively adjusted, the clamping member 15 is slipped over that part of the automobile where the invention is to be installed. Before the screws 15d are tightened, the clamping member 15 may be moved along the edge of the window or door until the proper place is reached. The outwardly projecting portion 19a with its upwardly extending portion 19b are then adjusted and the screw 19d tightened. The invention is then removed and the screw 18 tightened. The invention is then replaced and moved along the edge until the proper place is reached. The screws 15d are then tightened and the invention is ready for use.

In Figs. 14 and 15 I have illustrated a form of connecting member wherein there is a slot for receiving the disk-shaped portion 19c. The connection member 117 is provided with a flat surface for contact with the upper surface of the clamping member 15 on its portion 15c. The screw 18 secures the connection member 117 in place, being threaded in its bottom. The connection member 117 is provided with a slot to receive the disk-shaped portion 19c. To secure the disk-shaped portion in place, there is a screw pivot 119d which passes through the two extensions of the connection member 117 and is threaded in the extension opposite the head of the screw pivot 119d which permits the two extensions of the connection member 117 to be tightened against the disk-shaped portion 19c to hold the latter in fixed adjusted position.

While I have shown and described an embodiment of my invention, with slight modifications, in detail, it is to be understood that the disclosure is merely illustrative and that modifications and changes may be made without departing from the spirit of my invention and within its scope as claimed.

Having described my invention, what I claimed is:

1. A hand rest for the outside of an automobile comprising a securing means for attachment to the door or other part of an automobile, a projecting portion extending outwardly relatively to the securing member, an upwardly extending portion on the projecting portion at a distance from the securing member to permit the hand or wrist of the user to be supported thereby and held close to the outside of the automobile, and a connection device for holding the securing member and the outwardly projecting portion in fixed relative positions, said connection device including a connecting member having two adjusting surfaces in planes at a substantial angle to each other with a pivotal connection between one surface and the securing member and another pivotal connection between the other surface and the outwardly projecting portion.

2. A hand rest for the outside of an automobile comprising a securing means for attachment to the door or other part of an automobile, a projecting portion extending outwardly relatively to the securing member, an upwardly extending portion on the projecting portion at a distance from the securing member sufficient to permit the hand or wrist of the user to be supported thereby and held close to the outside of the automobile, and a connection device for holding the securing member and the outwardly projecting portion in fixed relative positions, said connection device including a connecting member having two adjusting surfaces in planes at substantially a right angle to each other with a pivotal connection between one surface and the securing member and another pivotal connection between the other surface and the outwardly projecting portion.

References Cited in the file of this patent

UNITED STATES PATENTS

| 131,068 | Schaefer | Sept. 3, 1872 |
| 1,374,907 | Cofrode | Apr. 19, 1921 |
| 1,399,744 | Brophy | Dec. 13, 1921 |
| 1,407,174 | Simpson | Feb. 21, 1922 |
| 1,898,008 | Fox | Feb. 21, 1933 |
| 1,984,855 | Zwierzina | Dec. 18, 1934 |
| 2,455,919 | Daon | Dec. 14, 1948 |
| 2,520,884 | Laube | Aug. 22, 1950 |
| 2,523,118 | Jones | Sept. 19, 1950 |
| 2,586,986 | Orrison | Feb. 26, 1952 |

FOREIGN PATENTS

| 32,420 | Germany | July 27, 1885 |
| 433,063 | Germany | Aug. 20, 1926 |